UNITED STATES PATENT OFFICE.

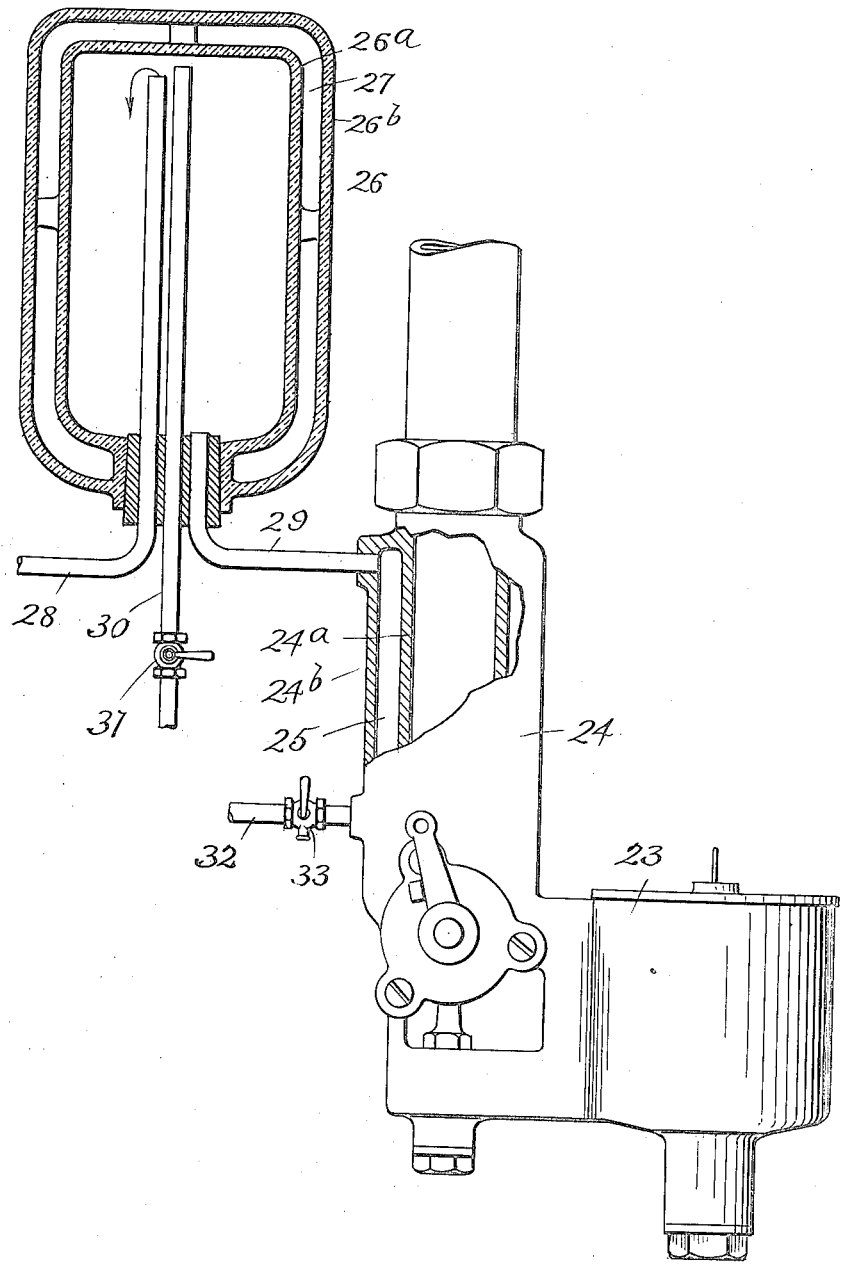

JUSTUS B. ENTZ, OF CLEVELAND, OHIO, ASSIGNOR TO THE WHITE COMPANY, OF CLEVELAND, OHIO, A CORPORATION OF OHIO.

CARBURETER-HEATER.

1,165,656. Specification of Letters Patent. Patented Dec. 28, 1915.

Application filed March 11, 1912. Serial No. 682,860.

*To all whom it may concern:*

Be it known that I, JUSTUS B. ENTZ, a citizen of the United States, residing at Cleveland, in the county of Cuyahoga and State of Ohio, have invented a certain new and useful Improvement in Carbureter-Heaters, of which the following is a full, clear, and exact description.

This invention relates to carbureters for internal combustion engines, and particularly to means for enhancing the vaporization of gasolene for starting an engine in operation after it has been at rest for sometime.

To secure good vaporization of gasolene it is customary at the present time to heat the walls of the mixing chamber of the carbureter by jacketing the chamber and connecting the jacket to the water cooling system of the engine, so that warm water is continuously circulated through the jacket as long as the engine is in operation. This method of keeping the walls of the mixing chamber hot so that the gasolene will be sufficiently vaporized is effective as long as the engine is in operation, but after it has been at rest for some time, and the water in the system is cooled, considerable difficulty is experienced in starting the engine, particularly when a low grade of gasolene is employed.

It is the object of the present invention to provide means whereby the walls of the mixing chamber can be maintained in a suitably warm state for a very long period after the engine has been at rest, or whereby the walls can be very readily heated so as to secure the initial vaporization of the gasolene to start the engine, and thus do away with the necessity of long periods of cranking or of "flooding" the carbureter.

The above object is accomplished by my invention and in a very effective manner by providing in some part of the water circulation system a heat insulated portion or heat retaining chamber in which the water is maintained for a long period at nearly a constant temperature or at least loses its heat much more slowly than the water in other parts of the system, and by utilizing the water in this portion of the system to heat the walls of the carbureter after the water in the other portions of the system is cold, to assist in obtaining the initial vaporization for starting purposes. This is preferably accomplished by providing in the water circulating system a heat retaining or heat insulated chamber in which water may be trapped and maintained warm for a considerable period after the water in the other parts of the system is cold. This chamber may be arranged at or adjacent the carbureter, and when it is desired to start the engine, the cold water may be drained from the jacket of the mixing chamber and the warm water retained in this heat retaining chamber may be caused to flow to the jacket of the mixing chamber so as to heat the walls thereof. Preferably this heat retaining portion of the water circulation system is constructed so as to prevent the loss of heat by radiation and conduction, and it may therefore be formed of glass or other material of very low heat conductivity and be inclosed by a vacuum space or by some insulating material, such as asbestos.

My invention may be further briefly summarized as consisting in certain novel details of construction and combinations and arrangements of parts which will be described in the specification and set forth in the appended claims.

In the accompanying drawing, wherein I have shown the preferred form of my invention, the single figure is a side elevation with parts in section, showing the carbureter and a portion of the water circulating system of an engine including the heat retaining chamber in which warm water is adapted to be trapped.

The carbureter which may be of any suitable construction is provided with a float controlled fuel chamber 23, and with a mixing chamber 24, having inner and outer walls 24$^a$ and 24$^b$, which are spaced apart in the usual manner so as to form between the same the water jacket space 25, through which is adapted to be circulated the water of the water circulating system of the engine. The water circulating system which is primarily for the purpose of cooling the engine, causes warm water to circulate normally while the engine is in operation through the jacket of the mixing chamber.

To provide means whereby water in some parts of the circulation system may be maintained in a warm condition, and to render this water available for use in heating the mixing chamber when the engine is at rest, and after the water in the main portions of the circulating system is cold, I provide adjacent the carbureter and connected to the circulation system so that the water will flow through the same as well as through the jacket of the mixing chamber, a separate heat retaining or heat insulating chamber 26, which preferably is of a construction similar to that of an ordinary thermos bottle. In other words, this chamber is formed of glass and is provided with inner and outer walls 26$^a$ and 26$^b$ which are separated by a vacuum space 27 from which air may be exhausted in any suitable manner. This chamber 26 as here shown is inverted,—that is, its closed end is at the top. At the bottom it is provided with an opening in which is tightly fitted a plug through which passes a water supplying pipe 28 which forms part of the circulation system, and may be connected to the engine water jacket, an outlet pipe 29 which is connected to the water jacket of the mixing chamber near the top thereof, and an air tube or pipe 30 which is provided near its lower end with a cock 31. Connected to the lower part of the water jacket 25 of the mixing chamber is an outlet pipe 32, which is provided with a two-way cock 33. Preferably, the water supply pipe for the heat retaining chamber 26 extends upwardly nearly to the top thereof, but the outlet pipe for this chamber extends only into the lower part of the chamber. The air pipe 30 also extends nearly to the top of the chamber.

In the use of this form of my invention, warm water normally passes into the chamber 26 by the pipe 28 and from this chamber to the water jacket 25, and this circulation continues as long as the engine is in operation. If the engine is at rest for a considerable period, the water which was trapped in the chamber 26 will lose its heat slowly and in fact will be maintained for a very long period at almost a constant temperature, although the water in other parts of the circulation system may be cold. If it is desired to start the engine after the water in the water jacket 25 is cold, the water will be drained from this jacket by means of the two-way cock 33 and if the air cock 31 is opened, the hot water will flow by gravity from the chamber 26 to the jacket 25. After the jacket 25 is filled with warm water, which can be ascertained by determining the temperature of the water which drips from the cock 33, the latter can be closed. The hot water thus supplied to the jacket 25 quickly heats the mixing chamber so that the gasolene can be readily evaporized to start the engine. It will be understood that when the cock 33 is closed, water may pass freely from the jacket 25 through the pipe 32 during the normal running of the engine. As soon as the engine starts, the water begins to circulate through the chamber 26 and jacket 25 in the usual manner, and after all the air has been driven from this chamber, or when water begins to drip from the pipe 30 the cock 31 can be closed.

Having thus described my invention, what I claim is:

1. In combination, a carbureter for internal combustion engines having a mixing chamber, means for heating the walls of the mixing chamber while the engine is in operation comprising a warm water circulating system including a water jacket about the mixing chamber, said system having in some part thereof a heat insulated portion in which warm water is retained when the engine is stopped, for use in assisting the vaporization of gasolene to start the engine after the water in the other parts of the system is cooled.

2. In combination, a carbureter for internal combustion engines having a mixing chamber, a system for circulating warm water about the wall of the mixing chamber when the engine is in operation so as to heat the mixing chamber, said system having a heat retaining chamber in which water is trapped when the engine is stopped and the circulation ceases, for use in heating the mixing chamber to assist the initial vaporization of gasolene to again start the engine.

3. In combination, a carbureter having a mixing chamber, means for heating the walls of the mixing chamber when the engine is in operation comprising a system for circulating warm water about the mixing chamber, said system having adjacent the carbureter a heat retaining chamber in which water is trapped and maintained warm for a considerable period after the water in the other parts of the system is cooled, said chamber being constructed to prevent loss of heat by radiation and conduction.

4. In combination with a carbureter provided with a water jacket, a system for circulating warm water through the jacket, a heat insulated chamber arranged in said system in which water is trapped when the engine is stopped and the circulation in said system ceases, and a pipe connection between said chamber and the jacket of the carbureter by which warm water may flow from said chamber to the jacket of the carbureter.

5. In combination with a carbureter provided with a water jacket, a system for circulating warm water through the jacket, a heat retaining chamber constructed to prevent loss of heat by radiation, and in which warm water is trapped when the engine is stopped, said chamber being arranged in said system above the level of the jacket, the lower part of said chamber having a pipe connection with the jacket whereby warm water may be drained from said chamber and conveyed to the said jacket.

6. In combination with a carbureter for internal combustion engines said carbureter having a water jacket, a system for circulating warm water through said jacket, said system having a heat retaining chamber, which is connected to the said jacket and in which water is trapped when the engine is stopped and when the circulation ceases, said chamber being above the level of the jacket, so that water may flow from the chamber to the jacket by gravity.

In testimony whereof, I hereunto affix my signature in the presence of two witnesses.

JUSTUS B. ENTZ.

Witnesses:
A. F. KWIS,
A. J. HUDSON.